United States Patent [19]

Stephens

[11] Patent Number: 4,506,751

[45] Date of Patent: Mar. 26, 1985

[54] TILT CAB TRUCK WITH ANTI-DIVE AND ANTI-SWAY CONTROL

[75] Inventor: Robert Stephens, Brookfield, Wis.

[73] Assignee: Applied Power Inc., Milwaukee, Wis.

[21] Appl. No.: 452,990

[22] Filed: Dec. 21, 1982

[51] Int. Cl.³ .............................................. B62D 27/04
[52] U.S. Cl. .................................. 180/89.15; 188/272; 188/285; 267/64.15; 280/689; 280/703; 280/707; 280/714; 280/772
[58] Field of Search .......................... 180/89.14, 89.15; 280/689, 703, 707, 714, 772; 188/272, 279, 285; 267/64.15, 64.18, 64.22

[56] References Cited

U.S. PATENT DOCUMENTS

| 3,948,341 | 4/1976 | Foster | 180/89.15 |
| 4,205,864 | 6/1980 | Hoefer | 280/714 |
| 4,310,172 | 1/1982 | Claude et al. | 280/703 |
| 4,333,668 | 6/1982 | Hendrickson et al. | 280/703 |

FOREIGN PATENT DOCUMENTS 2505267 11/1982 France ................................ 280/703

*Primary Examiner*—Joseph F. Peters, Jr.
*Assistant Examiner*—Kenneth R. Rice
*Attorney, Agent, or Firm*—John J. Byrne; Bradford E. Kile; Kevin M. O'Brien

[57] ABSTRACT

Disclosed is a tilt cab truck having a shock absorber assembly in which a path of fluid communication between the fluid reservoir and the interior of the shock absorber assembly is automatically blocked both when the brake is applied and when a roll-angle sensing device senses a roll angle greater than a predetermined value, thereby strengthening the shock absorbing function. Two embodiments of the invention are disclosed.

36 Claims, 5 Drawing Figures

TILT CAB TRUCK WITH ANTI-DIVE AND ANTI-SWAY CONTROL

TECHNICAL FIELD

This invention relates to tilt cab trucks having hydraulic shock absorber assemblies. In particular it relates to such trucks in which the strength of the shock absorbing function can be selectively increased to prevent or reduce diving upon braking and swaying upon (for example) going around a curve.

BRIEF SUMMARY OF THE INVENTION

The tilt cab truck of this invention has one or more hydraulic shock absorber assemblies. Each shock absorber assembly includes a shock absorber cylinder, a shock absorber rod, a shock absorber piston carried by the shock absorber rod and slidably received in the shock absorber cylinder, a reservoir for shock absorber fluid, and fluidic circuitry connecting the reservoir to the interior of the shock absorber cylinder on both sides of the shock absorber piston. A valve is provided in the fluidic circuitry such that, when the valve is in a first position, free flow is permitted and the shock absorber has its normal damping strength and, when the valve is in its second position, flow through that portion of the fluidic circuitry is prevented and the shock absorber has an increased damping strength.

DETAILED DESCRIPTION OF THE PRESENTLY PREFERRED EMBODIMENTS

Figure 1:
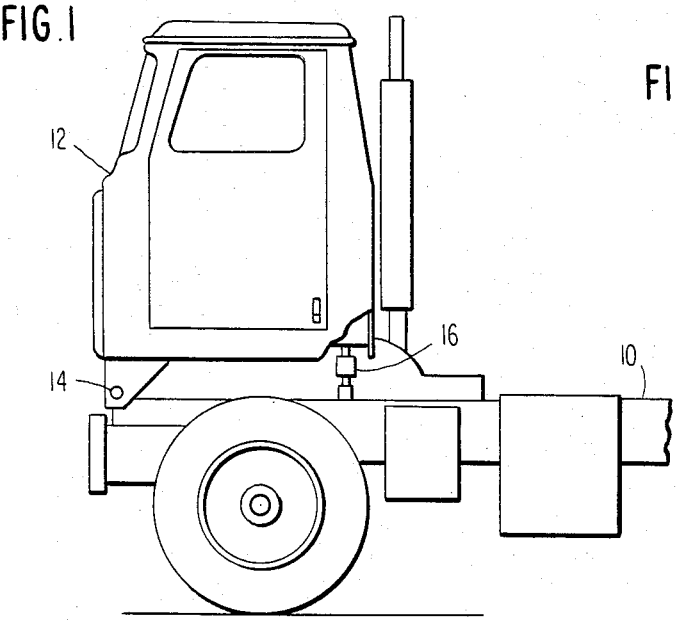
FIG. 1 is a side view of a tilt-cab truck incorporating the present invention.
Figure 5:
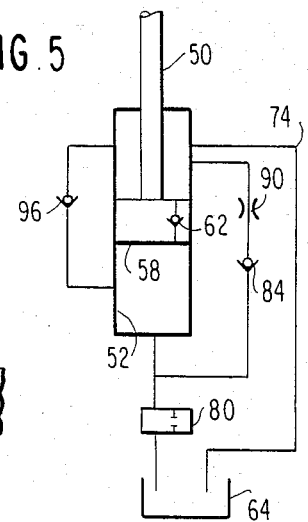
FIG. 5 is a schematic diagram of the second embodiment of the shock absorber assembly according to the present invention.

FIG. 1 shows a tilt-cab truck of a type which could incorporate either embodiment of the invention. It has a chassis 10, a cab 12 mounted on the chassis 10 and pivotable with respect to the chassis 10 about an axis 14, and one or more shock absorber and spring assemblies 16 disposed between the chassis 10 and the cab 12 at a point or points remote from the axis 14. Two embodiments of the shock absorber and spring assembly 16 are shown in the drawings, and each embodiment is described below separately.

The First Embodiment

Figure 2:
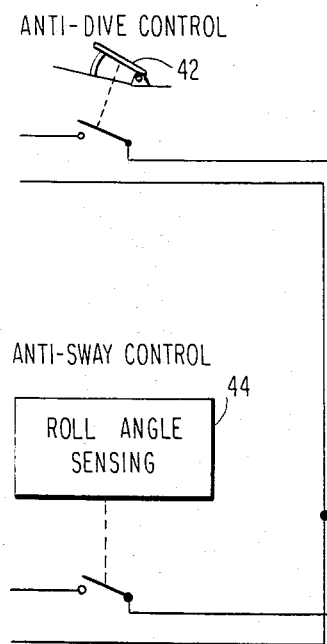
FIG. 2 is a schematic diagram of a first embodiment of a shock absorber assembly according to the present invention.

The first embodiment of the shock absorber and spring assembly 16 is shown in FIG. 2. It includes a shock absorber cylinder 18 mounted on either the chassis 10 or the cab 12, a shock absorber rod 20 mounted on the other of the chassis 10 or the cab 12 (of course, one of the mountings must be releasable, as is well known in the art), and a shock absorber piston 22 carried by the shock absorber rod 20 and slidably received in the shock absorber cylinder 18. An air spring 24 is disposed coaxially about the shock absorber cylinder 18. A reservoir 26 for shock absorber fluid is shown schematically as spaced from the shock absorber cylinder 18, but it is to be understood that, in actual practice, the reservoir 26 may surround or be incorporated into the shock absorber cylinder 18.

Two lines of fluid circuitry connect the reservoir 26 to the interior of the shock absorber cylinder 18. Fluid circuitry 28 connects the reservoir 26 to the downstroke side of the normal position of the shock absorber piston 22, the fluid circuitry 30 connects the reservoir 26 to the upstroke side of the normal position of the shock absorber piston 22.

Fluid circuitry 28 contains parallel branches 32 and 34. Branch 32 contains a one-way valve 36 which permits flow to the shock absorber cylinder 18, but prevents flow to the reservoir 26. Branch 34 contains a fluid flow restrictor 38 which permits restricted flow in either direction.

Fluid circuitry 30 contains a valve 40 which has a first position (shown in FIG. 2) which permits flow in either direction and a second position which prevents flow in both directions. The valve 40 is preferably an electric solenoid valve for speed in operation, but it can be a pneumatic or mechanical valve. It can be mounted in the shock absorber cylinder 18 (as in the second embodiment), or it can be located elsewhere. The tilt-cab truck has a brake 42 and a roll-angle sensing device 44, and the valve 40 is operatively connected to the brake 42 and the roll-angle sensing device 44 such that the valve 40 is in its first (or open) position when the brake 42 is not applied and the roll-angle sensing device 44 senses a roll angle less than a predetermined value and is in its second (or closed) position either when the brake 42 is applied or when the roll-angle sensing device 44 senses a roll angle greater than the predetermined value.

A restricted path of fluid communication is provided between the downstroke and upstroke sides of the shock absorber piston 22. Preferably that path of communication consists of a passageway 46 through the shock absorber piston 22. A one-way valve 48 is provided in the passageway 46 which permits fluid flow towards the rod side of the shock absorber piston 22, but prevents fluid flow in the opposite direction.

When the valve 40 is in its first (or open) position, downward motion of the shock absorber piston 22 due to unevenness in the road causes fluid to exit the downstroke side of the shock absorber cylinder 18 via the fluid circuitry 28 and the passageway 46. Since the pressure of the shock absorber rod 20 on the upstroke side of the shock absorber piston means that the decrease in volume on the downstroke side of the shock absorber piston 22 exceeds the increase in volume on the upstroke side of the shock absorber piston, fluid is returned to the reservoir 26 through the fluid circuitry 30 as well as through fluid circuitry 28. However, since the one-way valve 36 is closed, both paths to the reservoir 26 are restricted, providing a shock absorbing function.

When the valve 40 is in its first (or open) position, upward motion of the shock absorber piston 20 closes the valve 48 and causes fluid to exit the upstroke side of the shock absorber cylinder 18 via fluid circuitry 30. Since there is no restriction in the fluid circuit 30 when the valve 40 is in its first position, the flow is free. Simultaneously, the upward motion of the shock absorber piston 22 creates a vacuum on the downstroke side of the shock absorber cylinder 18, opening the one-way valve 36 and drawing fluid from the reservoir 26 into the downstroke side of the shock absorber cylinder 18 via both of the parallel branches 32 and 34 in the fluid circuitry 28. Since there is no restriction in the branch 32 of the fluid circuitry 28, the flow in this direction is also free.

When the valve 42 is in its second (or closed) position, downward motion of the shock absorber piston 22 causes fluid to exit the downstroke side of the shock absorber cylinder 18 via the fluid circuitry 28 and the passageway 46, as before. However, since the valve 42 now blocks fluid circuitry 30, the entire volume of fluid displaced by the entering piston rod 20 must return to the reservoir 26 through fluid circuitry 28. Since the one-way valve 36 is closed, that means that all of the fluid must pass through the restrictor 38, providing an increased shock absorbing function.

When the valve 42 is in its second (or closed) position, upward motion of the shock absorber piston 22 is prevented, since the fluid cannot exit the upstroke side of the shock absorber cylinder 18 either via the passageway 46 or fluid circuitry 30.

The Second Embodiment

Figure 3:
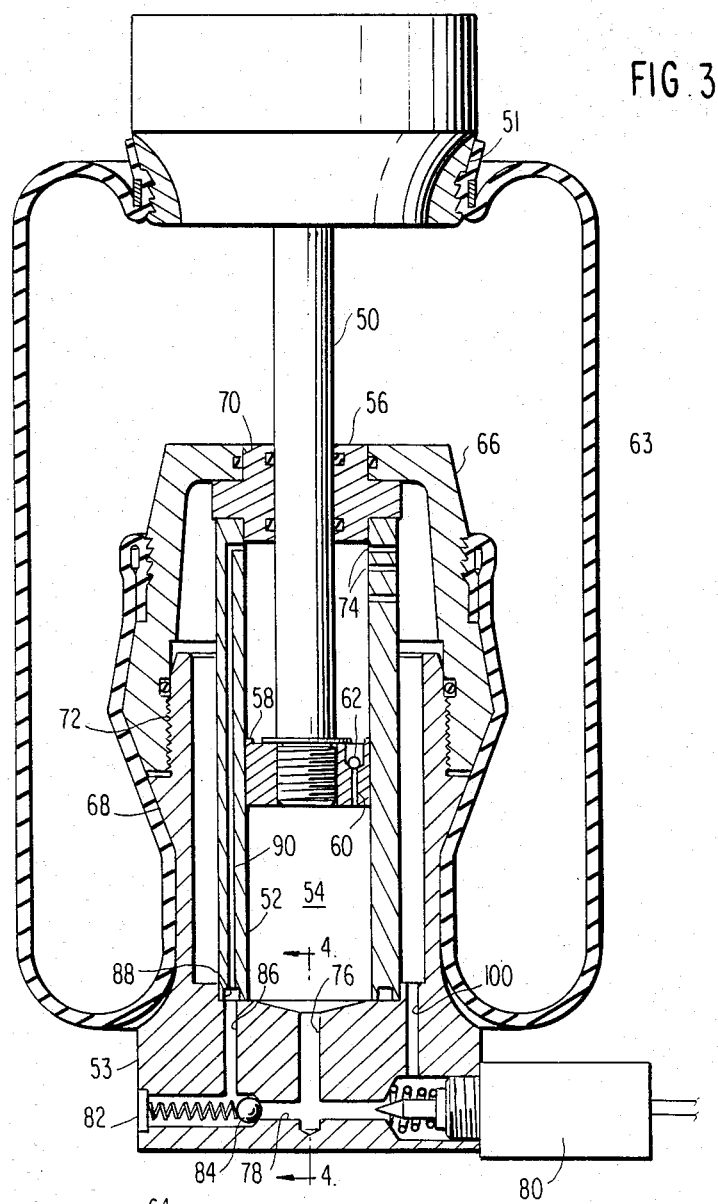
FIG. 3 is a cross-sectional view of a second embodiment of a shock absorber assembly according to the present invention.
Figure 4:
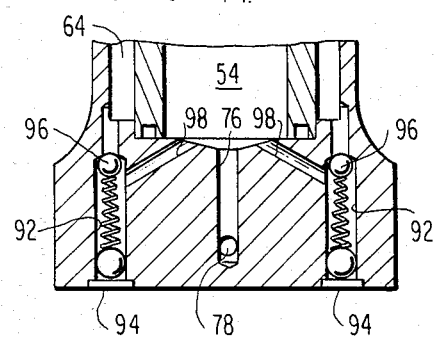
FIG. 4 is a view along the line 4—4 in FIG. 3.

The second embodiment of the shock absorber and spring assembly 16 is shown in FIGS. 3 and 4. It includes a piston rod 50 projecting from a first base 51 on either the cab 10 or the chassis 12, a cylinder 52 projecting from a second base 53 on the other of the cab 10 or the chassis 12 and containing a bore 54 closed at the end through which the piston rod 50 projects by a cab 56 through which the piston rod 50 slidingly projects, and a piston 58 carried by the piston rod 50 within the bore 54. A restricted conduit 60 leads through the piston 58. The conduit 60 contains a one-way valve 62 which permits flow to the rod-side of the piston 58, but prevents flow in the opposite direction. An air spring 63 is disposed coaxially about the cylinder 52.

An annular reservoir 64 is contained in the second base 53 surrounding the cylinder 52. The second base 53 has an upper component 66 and a lower component 68. The upper component 66 is a cup-shaped member which has an axial bore 70 which receives the cap 56. The upper component 66 is threadedly mounted on the lower component 68 at 72 so that the lower component 68 and the cylinder 52 can be removed separately for maintenance. The annular reservoir 64 extends into both the upper component 64 and the lower component 68.

A plurality of axially spaced conduits 74 lead from the bore 54 near the cap 56 to the reservoir 64. The purpose of having a plurality of axially spaced conduits 74 is to affect the reaction characteristics of the shock absorber and spring assembly 16. When the piston 58 begins an upward stroke, all of the conduits 74 are unobstructed, and the flow of hydraulic fluid out the conduits 74 is relatively free. However, towards the end of an upward stroke, the lower conduits 74 are obstructed by the piston 58, and the flow of the hydraulic fluid becomes much more restricted. Moreover, it will be noted that the uppermost conduit 74 is spaced from the cap 56. Accordingly, incompressible hydraulic fluid will be trapped in the bore 54 above the piston 58 when the piston 58 cuts off the uppermost conduit 74. This configuration prevents contact between the piston 58 and the cap 56 in all but the most extreme cases.

A blind axial bore 76 extends vertically from the face of the second base 53 which defines the bottom of the bore 54. The axial bore 74 communicates with a stepped radial bore 78 which contains a valve 80 described hereinafter. The radial bore 78 is plugged at 82 and contains a one-way valve 84 which permits flow of hydraulic fluid from the bore 54 beneath the piston 58 to the bore 54 above the piston 58, but prevents flow in the other direction. The radial bore 78 in turn communicates with a longitudinal blind bore 86 which extends vertically to the face of the second base 53. There the longitudinal bore 86 communicates with an annular groove 88 in the end of the cylinder 52 which abuts the second base 53. The purpose of the annular groove 88 is to make the angular orientation of the cylinder 52 relative to the second bore 53 irrelevant. The annular groove 88 in turn communicates with a restricted longitudinal conduit 90 in the cylinder 52 which extends nearly the length of the cylinder 52 and which communicates with the bore 54 adjacent the cap 56.

Turning to FIG. 4, it will be seen that the reservoir 64 also communicates with two stepped bores 92 which are plugged at 94 and which contain one-way valves 96. Angled bores 98 provide communication between the stepped bores 92 and the lower face of the bore 54, and the one-way valves 96 permit flow from the reservoir 64 through the stepped bore 92 and the angled bores 98 to the bore 54, but prevent flow in the opposite direction.

Returning to the valve 80 (shown in FIG. 3), it will be seen that it is a needle valve which provides some restriction even when open and which can be selectively extended into the stepped radial bore 78. When the valve 80 is extended, it blocks flow between the stepped radial bore 78 and a longitudinal bore 100 which extends from the stepped radial bore 78 to the reservoir 64. That is, when the valve 80 is in its first position (shown in FIG. 3), it permits restricted flow back and forth between the bore 54 and the reservoir 64, and, when the valve 80 is in its other position, it blocks flow between the bore 54 and the reservoir 64. The valve 80 is preferably an electric solenoid valve for speed of operation, but it can be a pneumatic or mechanical valve. In any event, the valve 80 is operatively connected to the brake 42 and the roll-angle sensing device 44 such that the valve 80 is in its first (or open) position when the brake 42 is not applied and the roll-angle sensing device 44 senses a roll angle less than predetermined value and is in its second (or closed) position either when the brake 42 is applied or when the roll-angle sensing device 44 senses a roll angle greater than the predetermined value.

When the valve 80 is in its first (or open) position, downward motion of the shock absorber piston 58 due to unevennesses in the road causes fluid to exit the downstroke side of the cylinder 52 via the axial bore 76 and the restrict conduit 60. (Note that fluid does not exit via the angled bores 98 because the one-way valves 96 are closed). From the axial bore 76, the fluid enters the stepped radial bore 78 and then flows freely through the open valve 80 and the longitudinal bore 100 to the reservoir 64. Fluid also flows from the stepped radial bore 78 to the longitudinal bore 86, opening the one-way valve 84, because the presence of the piston rod 50 on the upstroke side of the piston 58 means that the decrease in volume on the downstroke side of the piston 58 exceeds the increase in volume on the upstroke side of the piston 58. Thus, fluid flows to the upstroke side of the piston 58 through the longitudinal bore 86, the annular groove 88, and the longitudinal conduit 90 as well as through the conduit 60. However, both conduit 60 and conduit 90 are restricted, and the valve 80 partially blocks the stepped radial bore 78 to provide a shock absorbing function.

When the valve 80 is in its first (or open) position, upward motion of the piston 58 closes the one-way valve 62 and causes fluid to exit the upstroke side of the cylinder 52 via conduit 74. (Note that there is no flow through the restricted conduit 90 because the one-way valve 84 is closed). Since there is no restriction in the conduit 74, the flow is initially very free. Simultaneously, the upward motion of the piston 58 creates a vacuum on the downstroke side of the cylinder 52, drawing fluid from the reservoir 64 into the downstroke side of the cylinder 52 via the longitudinal bore 100, the stepped radial bore 78, and the axial blind bore 76 and via the stepped bores 92 and the angled bores 98. Since neither the stepped bores 92 nor the angled bores 98 are restricted, the flow in this direction (and hence the motion of the piston 58) is free.

When the valve 80 is in its second (or closed) position, downward motion of the piston 58 still causes fluid to exit the downstroke side of the cylinder 52 via both the axial bore 76 and the restricted conduit 60, and the stepped bores 92 are still closed by the one-way valves 96. However, with the valve 80 closed, all the flow must exit either directly to the upstroke side of the cylinder 52 via the restricted conduit 60 or indirectly to the upstroke side of the cylinder 52 via the blind axial bore 76, the stepped radial bore 78, the longitudinal bore 86, the annular groove 88, and the restricted conduit 90. From the upstroke side of the cylinder 52, the fluid flows freely to the reservoir 64 through the conduit 74. However, the fact that both the conduits 60 and 90 are restricted and that the pathway through the longitudinal conduit 100 is blocked entirely provides an increased shock absorbing function.

When the valve 80 is in its second (or closed) position, upward motion of the piston 58 creates a vacuum on the downstroke side of the cylinder 52 which closes the one-way valve 84, preventing fluid from the upstroke side of the cylinder 52 from reaching the downstroke side of the cylinder 52 via the restricted conduit 90, the annular groove 88, the longitudinal base 86, the stepped radial bore 78, and the blind axial bore 76. However, the vacuum opens the one-way valves 96, and fluid still flows freely to the downstroke side of the cylinder 52 from the reservoir 64 via the stepped bores 92 and the angled bores 98. Since neither the stepped bores 92 nor the angled bores 98 are restricted, the flow through this pathway (and hence the motion of the piston 58) is free.

Caveat

While the present invention has been illustrated by detailed descriptions of two preferred embodiments thereof, it will be obvious to those skilled in the art that various changes in form and detail can be made therein without departing from the true scope of the invention. For that reason, the invention must be measured by the claims appended hereto and not by the foregoing preferred embodiments.

I claim:
1. A tilt-cab truck comprising:
   (a) a chassis;
   (b) a cab mounted on said chassis and pivotable with respect to said chassis about an axis;
   (c) a roll-angle sensing device;
   (d) a shock absorber assembly disposed between said chassis or said cab, said shock absorber assembly comprising:
      (i) a shock absorber cylinder mounted on one of said chassis and said cab;
      (ii) a shock absorber rod mounted on the other of said chassis and said cab;
      (iii) a shock absorber piston carried by said shock absorber cylinder;
      (iv) a reservoir for shock absorber fluid;
      (v) a first path of fluid communication connecting said reservoir to the interior of said shock absorber cylinder on the downstroke side of the normal position of said shock absorber cylinder, said first path of fluid communication containing a one-way valve which permits flow to said shock absorber cylinder but prevents flow to said reservoir;
      (vi) a second path of fluid communication connecting said reservoir to the interior of said shock absorber cylinder on the downstroke side of the normal position of said shock absorber cylinder, said second path of fluid communication containing a fluid flow restrictor which permits restricted flow in either direction; and
      (vii) a third path of fluid communication connecting said reservoir to said shock absorber cylinder on the upstroke side of the normal position of said shock absorber piston, said that path of fluid communication containing a valve which in a first position permits flow in either direction and in a second position prevents flow in both directions, wherein said valve in said third path of fluid communication is operatively connected to said roll-angle sensing device such that said valve is placed in its first position when said roll-angle sensing device senses a roll angle less than a predetermined value and is placed in its second position when said roll-angle sensing device senses a roll angle greater than the predetermined value.

2. A tilt-cab truck as recited in claim 1 and further comprising a fourth, restricted path of fluid communication between the downstroke and upstroke sides of said shock absorber piston.

3. A tilt-cab truck as recited in claim 2 wherein said fourth path of fluid communication is a passageway through said shock absorber piston.

4. A tilt-cab truck as recited in claim 3 and further comprising a one-way valve in said passageway which permits fluid flow towards the rod side of said shock absorber piston but prevents fluid flow in the opposite direction.

5. A tilt-cab truck as recited in claim 1 and further comprises an air spring coaxial to said shock absorber cylinder.

6. A tilt-cab truck as recited in claim 1 wherein:
   (a) said tilt-cab truck further comprises a brake and
   (b) the valve in said third path of fluid communication is operatively connected to said brake such that said valve is placed in its first position when said brake is not applied and is placed in its second position when said brake is applied.

7. A tilt-cab truck as recited in claim 1 wherein:
   (a) said tilt-cab truck further comprises both a brake and a roll-angle sensing device and
   (b) the valve in said third path of fluid communication is operatively connected to said brake and to said roll-angle sensing device such that said valve is in its first position when said brake is not applied and said roll-angle sensing device senses a roll angle less than a predetermined value and is in its second position either when said brake is applied or when said roll-angle sensing device senses a roll angle greater than the predetermined value.

8. A tilt-cab truck as recited in claim 1 wherein the valve in said third path of fluid communication is an electric solenoid valve.

9. A tilt-cab truck as recited in claim 1 wherein said first and second paths of fluid communication have common connections with the interior of said shock absorber cylinder and with said reservoir.

10. A shock absorber assembly comprising:
(a) a shock absorber cylinder;
(b) a shock absorber rod;
(c) a shock absorber piston carried by said shock absorber rod and slidably received in said shock absorber cylinder;
(d) a reservoir for shock absorber fluid;
(e) a roll-angle sensing device;
(f) a first path of fluid communication connecting said reservoir to the interior of said shock absorber cylinder on the downstroke side of the normal position of said shock absorber piston, said first path of fluid communication containing a one-way valve which permits flow to said shock absorber cylinder but prevents flow to said reservoir;
(g) a second path of fluid communication connecting said reservoir to the interior of said shock absorber cylinder on the downstroke side of the normal position of said shock absorber cylinder, said second path of fluid communication containing a fluid flow restrictor which permits restricted flow in either direction; and
(h) a third path of fluid communication connecting said reservoir to said shock absorber cylinder on the upstroke side of the normal position of said shock absorber piston, said third path of fluid communication containing a valve which in a first position permits flow in either direction and in a second position prevents flow in both directions, wherein said valve in said third path of fluid communication is adapted to be operatively connected to a roll-angle sensing device such that said valve is placed in its first position when the roll-angle sensing device senses a roll angle less than a predetermined value and is placed in its second position when the roll-angle sensing device senses a roll angle greater than the predetermined value.

11. A shock absorber assembly as recited in claim 10 and further comprising a fourth, restricted path of fluid communication between the downstroke and upstroke sides of said shock absorber piston.

12. A shock absorber assembly as recited in claim 11 wherein said fourth path of fluid communication is a passageway through said shock absorber piston.

13. A shock absorber assembly as recited in claim 12 and further comprising a one-way valve in said passageway which permits fluid flow towards the rod side of said shock absorber piston but prevents fluid flow in the opposite direction.

14. A shock absorber assembly as recited in claim 10 and further comprising an air spring coaxial to said shock absorber cylinder.

15. A shock absorber assembly as recited in claim 10 wherein the valve in said third path of fluid communication is adapted to be operatively connected to a brake such that said valve is placed in its first position when the brake is not applied and is placed in its second position when the brake is applied.

16. A shock absorber assembly as recited in claim 10 wherein the valve in said third path of fluid communication is adapted to be operatively connected to both a brake and roll-angle sensing device such that said valve is in its first position when said brake is not applied and said roll-angle sensing device senses a roll angle less than a predetermined value and is in its second position either when said brake is applied or when said roll-angle sensing device senses a roll angle greater than the predetermined value.

17. A shock absorber assembly as recited in claim 10 wherein the valve in said third path of fluid communication is an electric solenoid valve.

18. A shock absorber assembly as recited in claim 10 wherein said first and second paths of fluid communication have common connections with the interior of said shock absorber cylinder and with said reservoir.

19. A tilt-cab truck comprising:
(a) a chassis;
(b) a cab mounted on said chassis and pivotable with respect to said chassis about an axis;
(c) a roll-angle sensing device;
(d) a shock absorber assembly disposed between said chassis or said cab, said shock absorber assembly comprising:
(i) a shock absorber cylinder mounted on one of said chassis and said cab;
(ii) a shock absorber rod mounted on the other of said chassis and said cab;
(iii) a shock absorber piston carried by said shock absorber cylinder;
(iv) a reservoir for shock absorber fluid;
(v) a first path of fluid communication connecting said reservoir to the interior of said shock absorber cylinder on the downstroke side of the normal position of said shock absorber piston, said first path of fluid communication containing a one-way valve which permits flow to said shock absorber cylinder but which prevents flow to said reservoir;
(vi) a second path of fluid communication connecting the interior of said shock absorber cylinder on the downstroke side of the normal position of said shock absorber piston to the interior of said shock absorber cylinder on the upstroke side of the normal position of said shock absorber piston, said second path of fluid communication containing in series a fluid flow restrictor which permits restricted flow in either direction and a one-way valve which permits flow to the upstroke side of the normal position of said shock absorber piston but which prevents flow to the downstroke side of the normal position of said shock absorber piston; and
(vii) a third path of fluid communication connecting said reservoir to said shock absorber cylinder on the downstroke side of the normal position of said shock absorver piston, said third path of fluid communication containing a valve which in a first position permits flow in either direction and in a second position prevents flow in both directions, wherein said valve in said third path of fluid communication is operatively connected to said roll-angle sensing device such that said valve is placed in its first position when said roll-angle sensing device senses a roll angle less than a predetermined value and is placed in its second position when said roll-angle sensing device senses a roll angle greater than the predetermined value.

20. A tilt-cab truck as recited in claim 19 and further comprising a fourth, restricted path of fluid communication between the downstroke and upstroke sides of said shock absorber piston.

21. A tilt-cab truck as recited in claim 20 wherein said fourth path of fluid communication is a passageway through said shock absorber piston.

22. A tilt-cab truck as recited in claim 21 and further comprising a one-way valve in said passageway which permits fluid flow towards the rod side of said shock absorber piston but prevents fluid flow in the opposite direction.

23. A tilt-cab truck as recited in claim 19 and further comprises an air spring coaxial to said shock absorber cylinder.

24. A tilt-cab truck as recited in claim 19 wherein:
(a) said tilt-cab truck further comprises a brake and
(b) the valve in said third path of fluid communication is operatively connected to said brake such that said valve is placed in its first position when said brake is not applied and is placed in its second position when said brake is applied.

25. A tilt-cab truck as recited in claim 19 wherein:
(a) said tilt-cab truck further comprises both a brake and a roll-angle sensing device and
(b) the valve in said third path of fluid communication is operatively connected to said brake and to said roll-angle sensing device such that said valve is in its first position when said brake is not applied and said roll-angle sensing device senses a roll angle less than a predetermined value and is in its second position either when said brake is applied or when said roll-angle sensing device senses a roll angle greater than the predetermined value.

26. A tilt-cab truck as recited in claim 19 wherein the valve in said third path of fluid communication is an electric solenoid valve.

27. A tilt-cab truck as recited in claim 19 wherein said second and third paths of fluid communication have common connections with the interior of said shock absorber cylinder and with said reservoir.

28. A shock absorber assembly comprising:
(a) a shock absorber cylinder;
(b) a shock absorber rod;
(c) a shock absorber piston carried by said shock absorber rod and slidably received in said shock absorber cylinder;
(d) a roll-angle sensing device;
(e) a reservoir for shock absorber fluid;
(f) a first path of fluid communication connecting said reservoir to the interior of said shock absorber cylinder on the downstroke side of the normal position of said shock absorber piston, said first path of fluid communication containing a one-way valve which permits flow to said shock absorber cylinder but which prevents flow to said reservoir;
(g) a second path of fluid communication connecting the interior of said shock absorber cylinder on the downstroke side of the normal position of said shock absorber piston to the interior of said shock absorber cylinder on the upstroke side of the normal position of said shock absorber piston, said second path of fluid communication containing in series a fluid flow restrictor which permits restricted flow in either direction and a one-way valve which permits flow to the upstroke side of the normal position of said shock absorber piston but which prevents flow to the downstroke side of the normal position of said shock absorber piston; and
(h) a third path of fluid communication connecting said reservoir to said shock absorber cylinder on the downstroke side of the normal position of said shock absorber piston, said third path of fluid communication containing a valve which in a first position permits flow in either direction and in a second position prevents flow in both directions, wherein said valve in said third path of fluid communication is adapted to be operatively connected to a roll-angle sensing device such that said valve is placed in its first position when the roll-angle sensing device senses a roll angle less than a predetermined value and is placed in its second position when the roll-angle sensing device senses a roll angle greater than the predetermined value.

29. A shock absorber assembly as recited in claim 28 and further comprising a fourth, restricted path of fluid communication between the downstroke and upstroke sides of said shock absorber piston.

30. A shock absorber assembly as recited in claim 29 wherein said fourth path of fluid communication is a passageway through said shock absorber piston.

31. A shock absorber assembly as recited in claim 30 and further comprising a one-way valve in said passageway which permits fluid flow towards the rod side of said shock absorber piston but prevents fluid flow in the opposite direction.

32. A shock absorber assembly as recited in claim 28 and further comprising an air spring coaxial to said shock absorber cylinder.

33. A shock absorber assembly as recited in claim 28 wherein the valve in said third path of fluid communication is adapted to be operatively connected to a brake such that said valve is placed in its first position when the brake is not applied and is placed in its second position when the brake is applied.

34. A shock absorber assembly as recited in claim 28 wherein the valve in said third path of fluid communication is adapted to be operatively connected to a roll-angle sensing device such that said valve is placed in its first position when the roll-angle sensing device senses a roll angle less than a predetermined value and is placed in its second position when the roll-angle sensing device senses a roll angle greater than the predetermined value.

35. A shock absorber assembly as recited in claim 28 wherein the valve in said third path of fluid communication is an electric solenoid valve.

36. A shock absorber assembly as recited in claim 28 wherein said second and third paths of fluid communications have common connection with the interior of said shock absorber cylinder and with said reservoir.

* * * * *